United States Patent
Davydov et al.

(10) Patent No.: US 10,098,020 B2
(45) Date of Patent: Oct. 9, 2018

(54) TECHNIQUES FOR SENDING OR RECEIVING CHANNEL STATE INFORMATION REPORTS ASSOCIATED WITH A COORDINATED MULTI-POINT SCHEME

(71) Applicant: INTEL CORPORATION, Santa Clara, CA (US)

(72) Inventors: Alexei Davydov, Nizhny Novgorod (RU); Gregory V. Morozov, Nizhny Novgorod (RU); Hooman Shirani-Mehr, Portland, OR (US); Alexander Maltsev, Nizhny Novgorod (RU); Vadim Sergeyev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 183 days.

(21) Appl. No.: 13/828,781

(22) Filed: Mar. 14, 2013

(65) Prior Publication Data

US 2014/0038623 A1 Feb. 6, 2014

Related U.S. Application Data

(60) Provisional application No. 61/679,627, filed on Aug. 3, 2012.

(51) Int. Cl.
*H04W 24/04* (2009.01)
*H04W 28/02* (2009.01)
(Continued)

(52) U.S. Cl.
CPC ............ *H04W 24/04* (2013.01); *H04B 17/27* (2015.01); *H04L 1/1861* (2013.01); *H04L 5/00* (2013.01);
(Continued)

(58) Field of Classification Search
CPC ..... H04L 5/0057; H04L 67/303; H04L 67/16; H04L 5/00; H04W 4/005; H04W 76/00;
(Continued)

(56) References Cited

U.S. PATENT DOCUMENTS

2010/0202311 A1* 8/2010 Lunttila et al. ................ 370/252
2010/0234037 A1* 9/2010 Terry et al. .................... 455/450
(Continued)

OTHER PUBLICATIONS

International Search Report and Written Opinion received for PCT Patent Application No. PCT/US2013/047363, dated Oct. 16, 2013, 11 pages.
(Continued)

*Primary Examiner* — Dinh P Nguyen

(57) ABSTRACT

Examples are disclosed for sending or receiving channel state information (CSI) reports associated with coordinated multi-point (CoMP) schemes. The examples include user equipment (UE) constraining CSI feedback to one or more transmission points implementing a CoMP scheme with the UE. The examples also include a transmission point such as an evolved node B (eNB) triggering CSI feedback and receiving a CSI report in response to the trigger. The CSI report generated based on the UE constraining CSI feedback. Constraining CSI feedback may include the UE generating fewer CSI reports, reusing information between CSI reports or increasing an amount of time allowed for processing and generating CSI reports. Other examples are described and claimed.

20 Claims, 11 Drawing Sheets

(51) Int. Cl.
<table>
<tr><td>H04W 52/00</td><td>(2009.01)</td></tr>
<tr><td>H04L 5/00</td><td>(2006.01)</td></tr>
<tr><td>H04L 12/24</td><td>(2006.01)</td></tr>
<tr><td>H04L 12/26</td><td>(2006.01)</td></tr>
<tr><td>H04L 12/807</td><td>(2013.01)</td></tr>
<tr><td>H04L 29/06</td><td>(2006.01)</td></tr>
<tr><td>H04L 29/08</td><td>(2006.01)</td></tr>
<tr><td>H04W 4/00</td><td>(2018.01)</td></tr>
<tr><td>H04W 8/18</td><td>(2009.01)</td></tr>
<tr><td>H04W 36/00</td><td>(2009.01)</td></tr>
<tr><td>H04W 28/04</td><td>(2009.01)</td></tr>
<tr><td>H04W 40/34</td><td>(2009.01)</td></tr>
<tr><td>H04W 52/02</td><td>(2009.01)</td></tr>
<tr><td>H04W 92/18</td><td>(2009.01)</td></tr>
<tr><td>H04W 88/12</td><td>(2009.01)</td></tr>
<tr><td>H04W 72/00</td><td>(2009.01)</td></tr>
<tr><td>H04W 72/04</td><td>(2009.01)</td></tr>
<tr><td>H04W 76/02</td><td>(2009.01)</td></tr>
<tr><td>H04W 76/14</td><td>(2018.01)</td></tr>
<tr><td>H04W 4/70</td><td>(2018.01)</td></tr>
<tr><td>H04W 76/10</td><td>(2018.01)</td></tr>
<tr><td>H04W 76/16</td><td>(2018.01)</td></tr>
<tr><td>H04W 76/11</td><td>(2018.01)</td></tr>
<tr><td>H04W 76/15</td><td>(2018.01)</td></tr>
<tr><td>H04W 4/80</td><td>(2018.01)</td></tr>
<tr><td>H04W 24/02</td><td>(2009.01)</td></tr>
<tr><td>H04N 21/2343</td><td>(2011.01)</td></tr>
<tr><td>H04N 21/258</td><td>(2011.01)</td></tr>
<tr><td>H04W 40/02</td><td>(2009.01)</td></tr>
<tr><td>H04W 16/18</td><td>(2009.01)</td></tr>
<tr><td>H04W 24/10</td><td>(2009.01)</td></tr>
<tr><td>H04W 4/02</td><td>(2018.01)</td></tr>
<tr><td>H04W 12/06</td><td>(2009.01)</td></tr>
<tr><td>H04W 64/00</td><td>(2009.01)</td></tr>
<tr><td>H04W 88/06</td><td>(2009.01)</td></tr>
<tr><td>H04L 12/703</td><td>(2013.01)</td></tr>
<tr><td>H04B 17/27</td><td>(2015.01)</td></tr>
<tr><td>H04W 74/08</td><td>(2009.01)</td></tr>
<tr><td>H04W 76/28</td><td>(2018.01)</td></tr>
<tr><td>H04W 76/04</td><td>(2009.01)</td></tr>
<tr><td>H04L 1/18</td><td>(2006.01)</td></tr>
<tr><td>H04W 16/28</td><td>(2009.01)</td></tr>
<tr><td>H04W 36/14</td><td>(2009.01)</td></tr>
</table>

(52) U.S. Cl.
CPC .......... *H04L 5/0035* (2013.01); *H04L 5/0055* (2013.01); *H04L 5/0057* (2013.01); *H04L 41/0659* (2013.01); *H04L 41/082* (2013.01); *H04L 41/0836* (2013.01); *H04L 43/0811* (2013.01); *H04L 45/28* (2013.01); *H04L 47/27* (2013.01); *H04L 65/1006* (2013.01); *H04L 65/4092* (2013.01); *H04L 65/80* (2013.01); *H04L 67/16* (2013.01); *H04L 67/303* (2013.01); *H04L 67/34* (2013.01); *H04L 67/36* (2013.01); *H04N 21/23439* (2013.01); *H04N 21/25825* (2013.01); *H04W 4/00* (2013.01); *H04W 4/005* (2013.01); *H04W 4/008* (2013.01); *H04W 4/02* (2013.01); *H04W 4/70* (2018.02); *H04W 4/80* (2018.02); *H04W 8/18* (2013.01); *H04W 12/06* (2013.01); *H04W 16/18* (2013.01); *H04W 24/02* (2013.01); *H04W 24/10* (2013.01); *H04W 28/0221* (2013.01); *H04W 28/0236* (2013.01); *H04W 28/04* (2013.01); *H04W 36/0072* (2013.01); *H04W 40/02* (2013.01); *H04W 40/34* (2013.01); *H04W 52/00* (2013.01); *H04W 52/0209* (2013.01); *H04W 52/0212* (2013.01); *H04W 52/0216* (2013.01); *H04W 52/0229* (2013.01); *H04W 64/003* (2013.01); *H04W 72/005* (2013.01); *H04W 72/04* (2013.01); *H04W 72/042* (2013.01); *H04W 72/044* (2013.01); *H04W 72/0406* (2013.01); *H04W 72/0413* (2013.01); *H04W 72/0446* (2013.01); *H04W 74/0816* (2013.01); *H04W 76/02* (2013.01); *H04W 76/021* (2013.01); *H04W 76/023* (2013.01); *H04W 76/025* (2013.01); *H04W 76/026* (2013.01); *H04W 76/048* (2013.01); *H04W 76/10* (2018.02); *H04W 76/11* (2018.02); *H04W 76/14* (2018.02); *H04W 76/15* (2018.02); *H04W 76/16* (2018.02); *H04W 76/28* (2018.02); *H04W 88/06* (2013.01); *H04W 16/28* (2013.01); *H04W 36/14* (2013.01); *H04W 52/0258* (2013.01); *H04W 88/12* (2013.01); *H04W 92/18* (2013.01); *Y02B 60/50* (2013.01); *Y02D 70/00* (2018.01); *Y02D 70/1222* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/22* (2018.01); *Y02D 70/23* (2018.01); *Y02D 70/24* (2018.01); *Y02D 70/25* (2018.01)

(58) Field of Classification Search
CPC ... H04W 40/34; H04W 28/0236; H04W 4/00; H04W 72/005; H04W 76/02; H04W 72/044; H04W 88/06; H04W 72/0413; H04W 72/04; H04W 72/0406; H04W 24/02; H04W 24/04; H04W 4/70; H04W 76/15; H04W 76/14; H04W 76/11; H04W 76/16; H04W 12/06; H04W 4/80; H04W 28/04; H04W 4/008; H04W 4/02; H04W 8/18; H04W 16/18; H04B 17/27
USPC .......................................................... 455/450
See application file for complete search history.

(56) References Cited

U.S. PATENT DOCUMENTS

<table>
<tr><td>2010/0272206 A1*</td><td>10/2010</td><td>Mazzarese et al. ........... 375/267</td></tr>
<tr><td>2011/0249578 A1*</td><td>10/2011</td><td>Nayeb Nazar ........ H04L 1/0027<br>370/252</td></tr>
<tr><td>2011/0269490 A1</td><td>11/2011</td><td>Earnshaw et al.</td></tr>
<tr><td>2012/0069917 A1*</td><td>3/2012</td><td>Liu ...................... H04B 7/0623<br>375/259</td></tr>
<tr><td>2012/0120817 A1*</td><td>5/2012</td><td>Khoshnevis et al. ......... 370/252</td></tr>
<tr><td>2012/0127869 A1</td><td>5/2012</td><td>Yin et al.</td></tr>
<tr><td>2012/0281563 A1*</td><td>11/2012</td><td>Comsa et al. ................. 370/252</td></tr>
<tr><td>2012/0287875 A1</td><td>11/2012</td><td>Kim et al.</td></tr>
<tr><td>2013/0088978 A1*</td><td>4/2013</td><td>Mondal .................. H04B 7/024<br>370/252</td></tr>
<tr><td>2013/0286866 A1*</td><td>10/2013</td><td>Hammarwall et al. ....... 370/252</td></tr>
<tr><td>2014/0078919 A1*</td><td>3/2014</td><td>Hammarwall ........ H04L 5/0057<br>370/252</td></tr>
</table>

OTHER PUBLICATIONS

R1-122779, "CSI feedback reporting in support of CoMP", Qualcomm Inc., 3GPP TSG-RAN WG1 Meeting #69, Prague, Czech Rep., May

(56) References Cited

OTHER PUBLICATIONS 25, 2012 <http://www.3gpp.org/ftp/tsg_ran/wg1_r11/TSGR1_69/Docs/R1-122779.zip>, (author unknown).
R1-121522, "Periodic and aperiodic CSI feedback modes for DL CoMP", Intel Corp., 3GPP TSG-RAN WG1 Meeting #68, Jeju, Korea, Mar. 30, 2012 <http://www.3gpp.org/ftp/tsg-ran/wg1_r11/TSGR1_68b/Docs/R1-121522.zip> (author unknown).
Extended European Search Report received for European Patent Application No. 13825244.0, dated Mar. 16, 2016, 9 pages.
"CSI feedback reporting in support of CoMP", Qualcomm Inc., 3GPP TSG-RAN WG1 #69, R1-122779, May 21-25, 2012, 3 pages (author unknown).
"CSI feedback for Downlink CoMP", Texas Instruments, 3GPP TSG-RAN WG1 #69, R1-122732, May 21-25, 2012, 4 pages (author unknown).
"DL CoMP rank reporting", Renesas Mobile Europe Ltd., 3GPP TSG-RAN WG1 #69, R1-122353, May 21-25, 2012, 5 pages (author unknown).
"Discussion on rank indicator (RI) report for CoMP", Intel Corporation., 3GPP TSG-RAN WG1 #69, R1-122631, May 21-25, 2012, 4 pages (author unknown).
"On CSI feedback processing complexity in CoMP", Renesas Mobile Europe Ltd., 3GPP TSG-RAN WG1 #69, R1-122350, May 21-25, 2012, 5 pages (author unknown).

\* cited by examiner

*Transmission Cases Table 200*

| Tx assumption | TP1 (BS 111) | TP2 (BS 121) |
|---|---|---|
| 1 | Serving | Interfering |
| 2 | Serving | Blanking |
| 3 | Blanking | Serving |
| 4 | Interfering | Serving |

*Rank Indicator Reports 300*

700

```
RECEIVE CSI PROCESSES SET ASSOCIATED WITH A CoMP
SCHEME FOR AN UE TO RECEIVE COORDINATED SIGNALS
FROM AT LEAST THREE TPs
702
          │
RECEIVE A CSI TRIGGER
704
          │
GENERATE ONE OR MORE CSI REPORTS USING THE CSI
PROCESSES SET BASED ON CONSTRAINING CSI FEEDBACK
FOR IMPLEMENTING THE CoMP SCHEME
706
   CONSTRAIN BY LIMITING A NUMBER OF CSI
   REPORTS BASED ON ONLY TWO TPs
   708

CONSTRAIN BY REUSING A GIVEN RI FOR EACH
   GENERATED CSI REPORT
   710

CONSTRAIN BY INCREASING AN AMOUNT OF TIME
   FOR PROCESSING THE CSI PROCESSES SET TO
   GENERATE THE ONE OR MORE CSI REPORTS
   712
          │
SEND THE ONE OR MORE GENERATED CSI REPORTS TO
FACILITATE IMPLEMENTING THE CoMP SCHEME
714
```

*FIG. 7*

Storage Medium 800

*Computer Executable Instructions for 700*

TRANSMIT A CSI TRIGGER TO UE TO CAUSE THE UE TO GENERATE ONE OR MORE CSI REPORTS ASSOCIATED WITH CSI PROCESSES SETS RECEIVED BY THE UE FROM AN eNB FOR IMPLEMENTING A COMP SCHEME WITH THE UE THAT INCLUDES THE UE RECEIVING COORDINATED SIGNALS FROM MORE THAN TWO TPs, THE eNB BEING ONE OF THE MORE THAN TWO TPs
1002

RECEIVE THE ONE OR MORE CSI REPORTS FROM THE UE BASED ON THE UE CONSTRAINING CSI FEEDBACK TO THE eNB
1004

ADJUST COORDINATED SIGNALS TRANSMITTED TO THE UE BASED, AT LEAST IN PART, ON THE ONE OR MORE CSI REPORTS
1006

*FIG. 10*

Storage Medium 1100

*Computer Executable Instructions for 1000*

*FIG. 11*

TECHNIQUES FOR SENDING OR RECEIVING CHANNEL STATE INFORMATION REPORTS ASSOCIATED WITH A COORDINATED MULTI-POINT SCHEME

RELATED CASE

This application claims priority to U.S. Provisional Patent Application No. 61/679,627, filed on Aug. 3, 2012.

TECHNICAL FIELD

Examples described herein are generally related to wireless communication devices.

BACKGROUND

Coordinated multi-point (CoMP) is an example of a collaborative scheme increasingly being used in wireless networks. CoMP may be implemented to mitigate interference between base stations, improve system spectral efficiency and enhance throughput performance for user equipment (UE) located at the edge of a base station's coverage area. In some examples, base stations for a wireless network may coordinate downlink transmissions to UEs to accomplish at least one of these goals associated with improving a wireless network's performance.

BRIEF DESCRIPTION OF THE DRAWINGS

FIG. 7 illustrates an example of a first logic flow.
FIG. 8 illustrates an example of a first storage medium.
FIG. 10 illustrates an example of a second logic flow.
FIG. 11 illustrates an example of a second storage medium.

DETAILED DESCRIPTION

Figure 1:
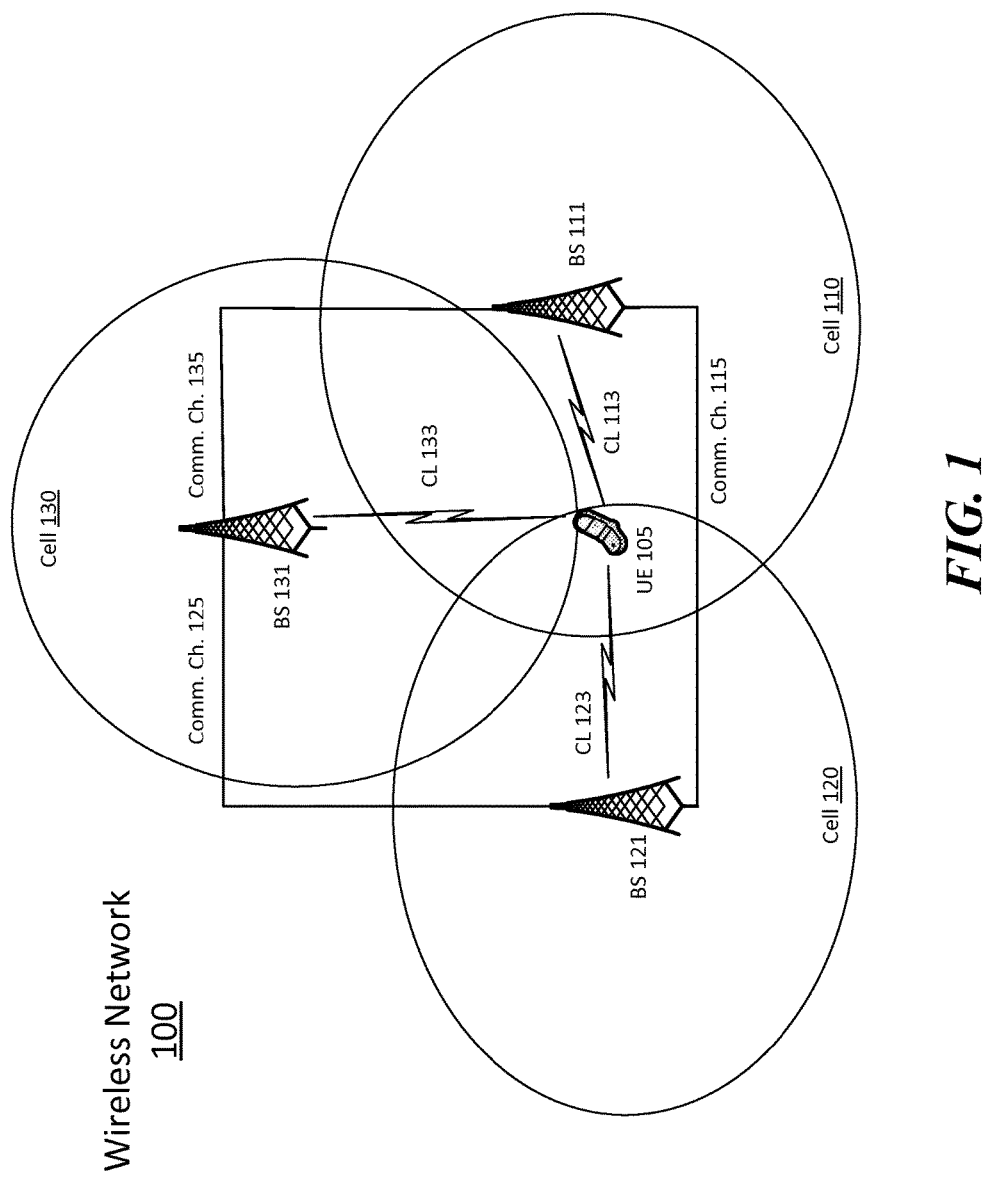
FIG. 1 illustrates an example of a wireless network.

Examples are generally directed to improvements for wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP LTE and LTE-A standards, such as the 3GPP LTE Evolved UMTS Terrestrial Radio Access Network (E-UTRAN), Universal Terrestrial Radio Access (E-UTRA) and LTE-A Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 January 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, coordinated multi-point (CoMP) may be implemented for a wireless network (e.g., a Wireless LTE or LTE-A network) to possibly mitigate interference between base stations, improve system spectral efficiency and enhance throughput performance for user equipment (UE) located at the edge of one or more coverage areas for base stations (e.g., evolved Node Bs (eNBs)) that may possibly serve the UE. These CoMP schemes may include providing coordinated signals to the UE based on feedback received from the UE. Such feedback may include channel state information (CSI) reports generated and provided by the UE based on a CSI processes set configured for and received by the UE and corresponding to different transmission cases from the eNBs implementing a given CoMP scheme with the UE. The configured CSI processes set may include a plurality of CSI processes. Each CSI process may include a nonzero power CSI-reference signal (CSI-RS) resource and an interference measurement resource (IMR) from a given transmission point (TP)/eNB implementing or participating in the given CoMP scheme.

These components of each CSI process may also be referred to as a channel state information interference measurement (CSI-IM) resource.

Recent changes to the 3GPP LTE standards to include LTE-A, Release 11 have increased the maximum number of nonzero power CSI-IM resources for a CSI processes set to three to accommodate at least three TPs. As a result, transmission cases for the at least three TPs may result in an increased number of CSI reports being processed and provided by a UE. The increased number of CSI reports may place an unacceptably high computational burden on the UE. It is with respect to these and other challenges that the examples described herein are needed.

In some examples, techniques are implemented for receiving, at user equipment (UE) capable of operating in compliance with one or more 3GPP LTE standards that may include LTE-A, a CSI processes set associated with a CoMP for the UE to receive coordinated signals from more than two transmission points. For these examples, one or more CSI reports using the CSI processes set may be generated based on constraining CSI feedback for implementing the CoMP scheme. Constraining CSI feedback may include at least one of limiting a number of CSI reports based on only two transmission points, reusing a given rank indicator (RI) for each generated CSI report or increasing an amount of time for the UE to process the CSI processes set to generate the one or more CSI reports. The one or more generated CSI reports may then be transmitted to facilitate implementing the CoMP scheme. For example, TPs involved in implementing the CoMP scheme may adjust coordinated signals transmitted to the UE based on the transmitted CSI reports.

FIG. 1 illustrates an example of a wireless network 100. In some examples, as shown in FIG. 1, wireless network 100 includes cells 110, 120 and 130. Also, as shown in FIG. 1, cells 110, 120 and 130 may each include a base station (BS) 111, a BS 121 and a BS 131, respectively. As shown in FIG. 1, BS 111 may be coupled or interconnected with BSs 121 and 131 via backhaul communication channels. These backhaul communication channels are shown in FIG. 1 as a communication channel (Comm. Ch.) 115, a Comm. Ch. 125 and a Comm. Ch. 135.

According to some examples, as shown in FIG. 1, user equipment (UE) 105 may be located at or near the edge of cells 110, 120 and 130. Also, as shown in FIG. 1, UE 105 may be communicatively coupled to and/or may be able to measure communication signals from BSs 111, 121 and 131 via a communication link (CL) 113, a CL 123 and a CL 133, respectively.

In some examples, BSs 111, 121 or 131 may include logic and/or features arranged to implement a CoMP scheme with UE 105. For these examples, wireless network 100 may be configured to operate in compliance with one or more 3GPP LTE standards to include LTE-A and BSs 111, 121 or 131 may operate as eNBs configured to implement the CoMP scheme. The CoMP scheme may include, but is not limited to, such CoMP schemes as a joint transmission (JT) CoMP scheme, a dynamic point selection/dynamic point blanking (DPS/DPB) CoMP scheme or a coordinated scheduling/coordinated beamforming (CS/CB) CoMP scheme.

According to some examples, the logic and/or features at one or more base stations from among BSs 111, 121 or 131 may be capable of configuring a CSI processes set for UE 105. The CSI processes set may include a plurality of CSI processes. Each CSI process may include, but is not limited to a CSI-IM resource. For these examples, the CSI processes set configured for UE 105 may be associated with a CoMP scheme being implemented by BSs 111, 121 or 131 with UE 105. As described more below, UE 105 may include logic and/or features capable of using the configured CSI processes set to generate and send/transmit one or more CSI reports (e.g., to BSs 111, 121 or 131) to facilitate implementing the CoMP scheme. These CSI reports may indicate to BSs 111, 121 or 131 the respective quality of CLs 113, 123 or 133 maintained between these base stations and UE 105. In some examples, coordinated signals (e.g., received via CLs 113, 123 or 133) may be received by UE 105 from BSs 111, 121 or 131 based on or responsive to CSI reports received from UE 105.

In some examples, BSs 111, 121 or 131 may at least periodically request CSI reports associated with one or more configured CSI processes sets for implementing a given CoMP scheme. For these examples, a base station from among BSs 111, 121 or 131 may transmit a CSI trigger to UE 105 to cause UE 105 to generate and send one or more CSI reports. As described more below, UE 105 may include logic and/or features to constrain CSI feedback. The constrained CSI feedback may include limiting a number of CSI reports based on only two TPs, reusing a given rank indicator for each generated CSI report or increasing an amount of time for UE 105 to process the configured CSI processes set to generate the one or more CSI reports to be sent to the base station.

According to some examples, UE 105 may be any electronic device having wireless capabilities or equipment. For some examples, UE 105 may be implemented in a fixed device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

According to some examples, the logic and/or features at BSs 111, 121 or 131 may include system equipment, such as network equipment for a communications system or network compliant with one or more 3GPP LTE Specifications (e.g., LTE-A). For example, these base stations may be implemented as evolved Node B (eNB) base stations or remote radio heads for a Wireless LTE or LTE-A network. Although some examples are described with reference to a base station, eNB or remote radio head, embodiments may utilize any network equipment for a wireless network. The examples are not limited in this context.

In some examples, Comm. Chs. 115, 125 or 135 may be arranged or configured as backhaul communication channels separately including one or more communication links via which BSs 111, 121 or 131 may exchange information. These one or more communication links may include various types of wired, wireless or optical communication mediums. For these examples, the communication links may be operated in accordance with one or more applicable communication or networking standards in any version. One such communication or networking standard may include 3GPP LTE-A and Comm. Chs. 125, 135 or 135 may be separately arranged to serve as X2 communication channels. According to some examples, logic and/or features at BS 111, 121 or 131 may include an X2 interface that at least allows for BSs 111, 121 or 131 to exchange information via an X2 communication channel coupled between these base stations.

Figures 2, 3:
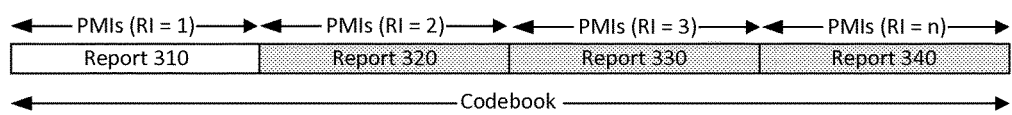
FIG. 2 illustrates an example of transmission cases.
FIG. 3 illustrates example rank indicator reports.

FIG. 2 illustrates an example of transmission cases table 200. According to some examples, transmission cases table 200 may depict transmission cases based on two TPs. As shown in FIG. 2, the two TPs may include BSs 111 and 121 from wireless network 100. In some examples, as shown in FIG. 1, UE 105 may be located more in cells 110 and 120 and just touching cell 130. Thus, for these examples, CSI feedback for a CoMP scheme implemented for UE 105 that includes receiving coordinated signals from BSs 111, 121 or 131 may be constrained by limiting a number of CSI reports based on only considering transmission cases for the two strongest TPs, although more than just the two strongest TPs may be involved in implementing a given CoMP scheme. Therefore, as shown in FIG. 2, the two strongest TPs may include BSs 111 and 121 and four transmission (Tx) assumptions for these base stations/TPs are listed in table 200. UE 105 may include logic and/or features capable of generating four CSI reports based on the four Tx assumptions listed in table 200. If the number of TPs had not been limited to the two strongest TPs, then UE 105 would have to generate a total of 12 CSI reports to account for three TPs and the associated Tx assumptions for these three TPs. Reducing the number of CSI reports may therefore reduce computational burdens on UE 105 when implementing the CoMP scheme with at least three TPs that may include BSs 111, 121 and 131.

According to some examples, limiting the number of TPs may also be used to constrain a maximum number of interference assumptions (e.g., number of interference measurement resources or CSI-IM resources) UE 105 may use when generating a CSI report to provide CSI feedback to BSs 111, 121 or 131. For example, for the four Tx assumptions listed in table 200, a number of interference assumptions is equal to three, corresponding to interference from TP1 (Tx assumption 4), interference from TP2 (Tx assumption 1) and no interference from TP1 and TP2 (Tx assumptions 2 and 3). Constraining the maximum number of interference assumptions may also reduce computational burdens or requirements on UE 105 when implementing a given CoMP scheme.

FIG. 3 illustrates an example of rank indicator reports 300. In some examples, as shown in FIG. 3, rank indicator reports 300 includes reports 310, 320, 330 and 340. For these examples, reports 310, 320, 330 and 340 may be associated with calculations of channel quality indicators (CQIs) and precoding matrix indicators (PMI) considering configured codebook parameters used to establish communication links between a UE and base stations. For example, for one of more 3GPP LTE standards to include LTE-A, a configured codebook parameter may be the codebookSubsetRestriction parameter. Thus, UE 105 may include logic and/or features to consider the configured LTE-A codebookSubsetRestriction parameter to establish CLs. 113, 123 and 133 with BSs 111, 121 and 131, respectively.

In some examples, logic and/or features at UE 105 for a CSI process included in a CSI processes set may calculate or generate CQIs for PMIs associated with reports 310, 320, 330 and 340. For these examples, as shown in FIG. 3, PMIs associated with reports 310, 320, 330 and 340 may be ranked based on considering a configured codebook parameter. For these examples, the PMI associated with report 310 is shown as having the highest RI rank that may be due to the highest total CQI. For other CSI processes in CSI processes set rather than recalculate and determine an RI for each transmission case associated with a CoMP scheme that may include up to 12 CSI reports, the calculated RI may be used for all transmission cases. In other words, once a given RI is determined for a single transmission case (e.g., for a given CSI process) that given RI is reused for CSI reports for the remaining transmission cases (other CSI processes in the CSI processes set). So the PMIs associated with report 310 and have an RI=1 would be used for all CSI reports. Reuse of report 310 for all transmission cases may substantially reduce computational workload for the logic and/or feature at UE 105 when generating CSI reports and thus may serve as a constraint on the processing of CSI feedback provided to BSs 111, 121 or 131 from UE 105.

Figure 4:
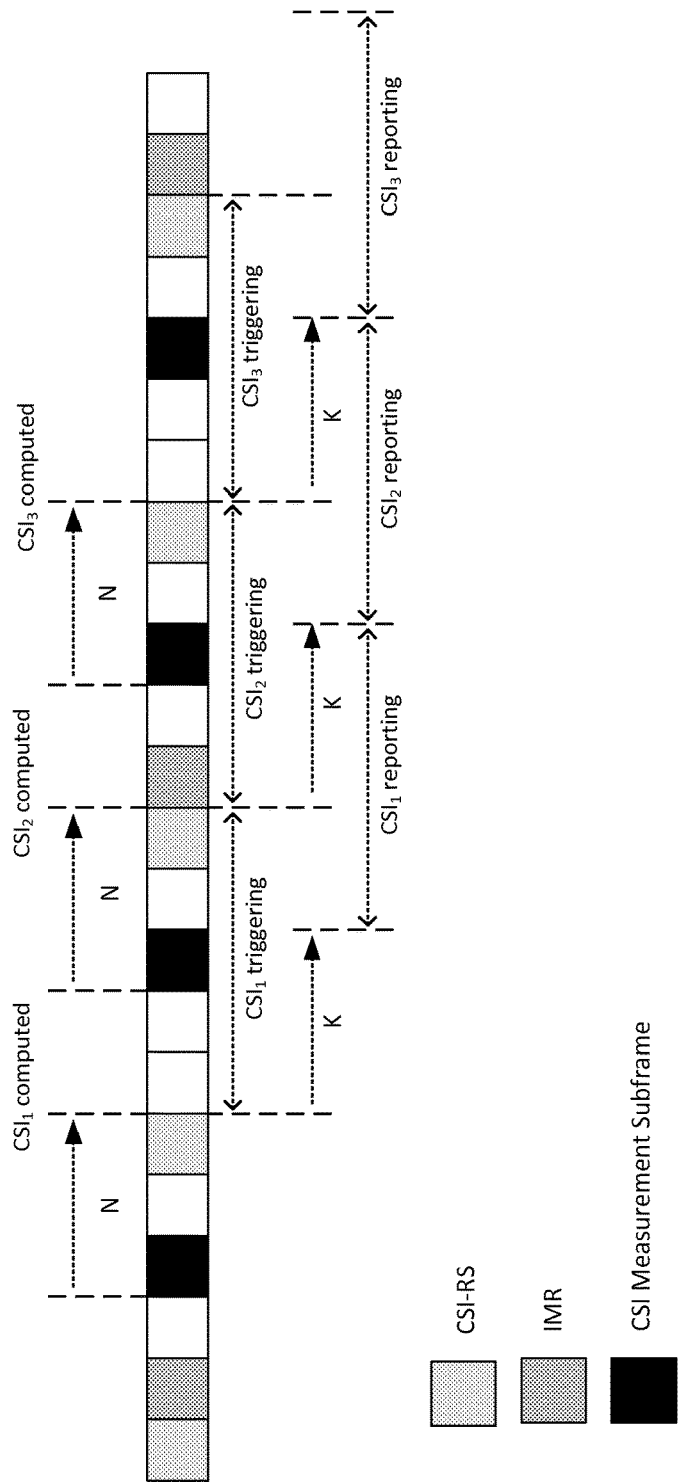
FIG. 4 illustrates an example of a CSI report processing and reporting timeline.

FIG. 4 illustrates an example of a CSI report processing and reporting timeline 400. According to some examples, CSI report processing and reporting timeline 400 includes a depiction of event or action timing that may occur at a UE such as UE 105 when generating and transmitting a single CSI report. Each block shown in FIG. 4 may represent a time period (e.g., 1 millisecond) from the perspective of the UE. Each time period, for example, may equate to an LTE-A subframe. For these examples, the single CSI report may be generated and transmitted in association with implementing a CoMP scheme for the UE to receive coordinated signals from more than two TPs. For example, the more than two TPs may include base stations such as BSs 111, 121 or 131 as shown and described for in FIG. 1.

In some examples, the colored/shaded subframes are shown in FIG. 4 as a solid, light-grey subframe that represents a CSI-RS, a patterned, darker-grey subframe that represents an IMR and a black subframe that represents a CSI measurement subframe. For these examples, CSI-RS and IMR subframes depicted in CSI report processing and reporting scheme 400 may indicate at what points in time a UE may receive elements of a CSI processes set. Also, the CSI measurement subframe may indicate what points in time the UE gathers received CSI-RS and IMR information to begin processing that gathered information to generate a CSI report.

According to some examples, CSI report processing and reporting scheme 400 may be an attempt to constrain processing of CSI feedback when implementing the CoMP scheme for the UE to receive coordinated signals from more than two TPs. For these examples, additional time may be allowed for logic and/or features of the UE to process information associated with a given CSI processes set in order to generate a CSI report and then report or transmit the generated CSI report. For example, the UE may be allowed a total of at least "N" subframes after a CSI measurement subframe to calculate CSI information prior to using the calculated CSI information when a CSI trigger is received, where N may equate to any positive whole integer. Also, The UE may be allowed a total of at least "K" subframes to generate and send/transmit a CSI report after receiving the CSI trigger, when K may equate to any positive whole integer. For the example shown for CSI report processing and reporting timeline 400, both K and N equate to 3 subframes, although K and N may each represent any number of subframes in other examples.

In some examples, as shown in FIG. 4, as part of implementing CSI report processing and reporting timeline 400, a single CSI report may have been computed by the time a $CSI_1$, $CSI_2$ or $CSI_3$ triggering was initiated responsive to receiving a CSI trigger. For these examples, logic and/or features of the UE may have started processing information associated with receiving the elements of a received CSI processes set at least N (e.g., N=3) subframes prior to the $CSI_1$, $CSI_2$ or $CSI_3$ triggering as shown by the $CSI_1$, $CSI_2$ or $CSI_3$ computed indications in FIG. 4 following N subframes after the black CSI measurement subframes. Also, the single CSI report may be reported or transmitted in at least K (e.g., K=3) subframes after the $CSI_1$, $CSI_2$ or $CSI_3$ triggering as shown by the $CSI_1$, $CSI_2$ or $CSI_3$ reporting indications in FIG. 4.

Figure 5:
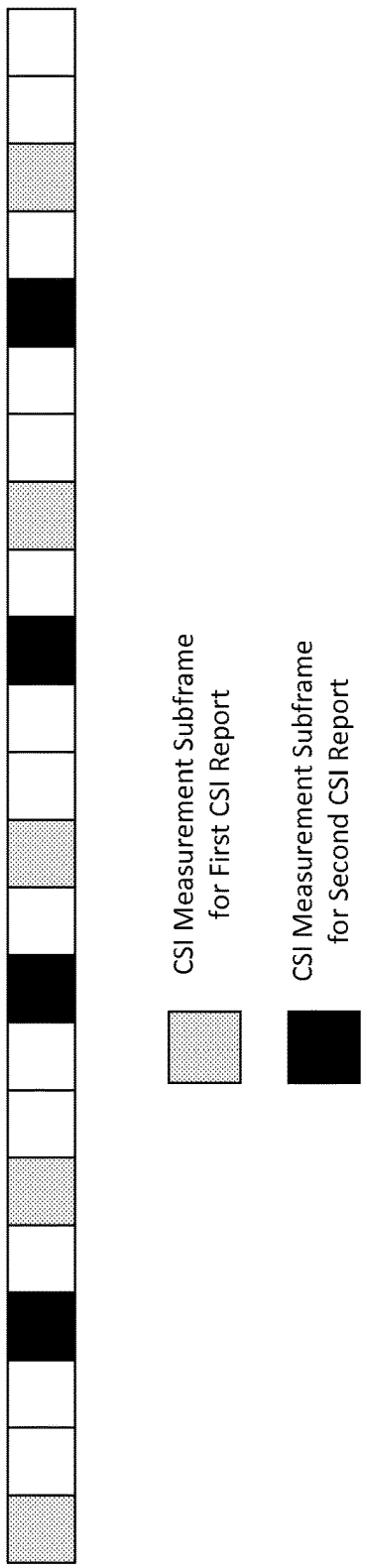
FIG. 5 illustrates an example of a multiple CSI report scaling scheme.

FIG. 5 illustrates an example of a multiple CSI report scaling scheme 500. According to some examples, multiple CSI report scaling scheme 500 includes a depiction of events or actions that may occur at a UE such as UE 105 to report multiple CSI reports in a serial manner. For these examples, similar to FIG. 4, each block in FIG. 5 may represent a time period (e.g., 1 millisecond) from the perspective of the UE and may equate to an LTE-A subframe. For these examples, the multiple CSI reports may be generated and transmitted in association with implementing a CoMP scheme for the UE to receive coordinated signals from more than two TPs. For example, the more than two TPs may include base stations such as BSs 111, 121 or 131 as shown in FIG. 1, although in other examples, just two TPs may be included.

In some examples, the colored/shaded subframes are shown in FIG. 5 as a light-grey subframe that may represent a CSI measurement subframe for a first CSI process and a black subframe that may represent a CSI measurement subframe for a second CSI process. For these examples, the first CSI process may be associated with a first CSI process in a first CSI processes set that may include CSI-IM resources or components configured for the UE in association with a first transmission case to generate a first CSI report. The second CSI process may be associated with a second CSI processes set that may include CSI-IM resources or components configured for the UE in association with a second transmission case to generate a second CSI report. The first and second transmission cases may be based on the more than two TPs (e.g., 2 of 12 possible transmission cases) or may be based on a limited number of just two TPs (e.g., 2 of 4 possible transmission cases—see FIG. 2).

According to some examples, multiple CSI report scaling scheme 500 may be an attempt to constrain CSI feedback processing requirements when implementing the CoMP scheme for the UE to receive coordinated signals from more than two TPs, although in other examples two TPs may be used. For these examples, additional time may be allowed for logic and/or features of the UE to process a received CSI processes set in light of generating multiple CSI reports. The additional time may be allowed by scaling a periodicity and assigning different subframe offsets of given CSI measurements subframes associated with given CSI process of the CSI processes sets such that the logic and/or features of the UE may be capable of serially processing the configured CSI processes sets and generate multiple CSI reports in different time occasions. For example, the subframe spacing between respective grey subframes and respective black subframes in multiple CSI report scaling scheme 500 may be scaled to allow logic and/or features of the UE additional time to process the first configured CSI processes set and generate the first CSI report before starting to process the second configured CSI processes set and generate the second CSI report. As shown in FIG. 5, the first and second CSI reports are each updated every 5 subframes, although this disclosure is not limited to 5 subframes.

The ability to serially process the configured CSI processes sets may enable a more efficient use of processing resources at the UE. Otherwise, parallel processing resources may be needed to meet tighter timelines to process configured CSI processes sets and provide multiple CSI reports.

In some examples, constraints on scheduling of transmissions of non-zero power CSI-RS and/or CSI-IM resources from base stations implementing the CoMP scheme may be implemented. The constraints on scheduling may be to avoid receiving of more than one non-zero power CSI-RS and/or CSI-IM resource in the same subframes. Overlapping subframes may minimize processing requirements at the UE for a maximum number of simultaneously processed non-zero CSI-RSs and/or CSI-IMs resources included in a given CSI process of a CSI processes set.

Figure 6:
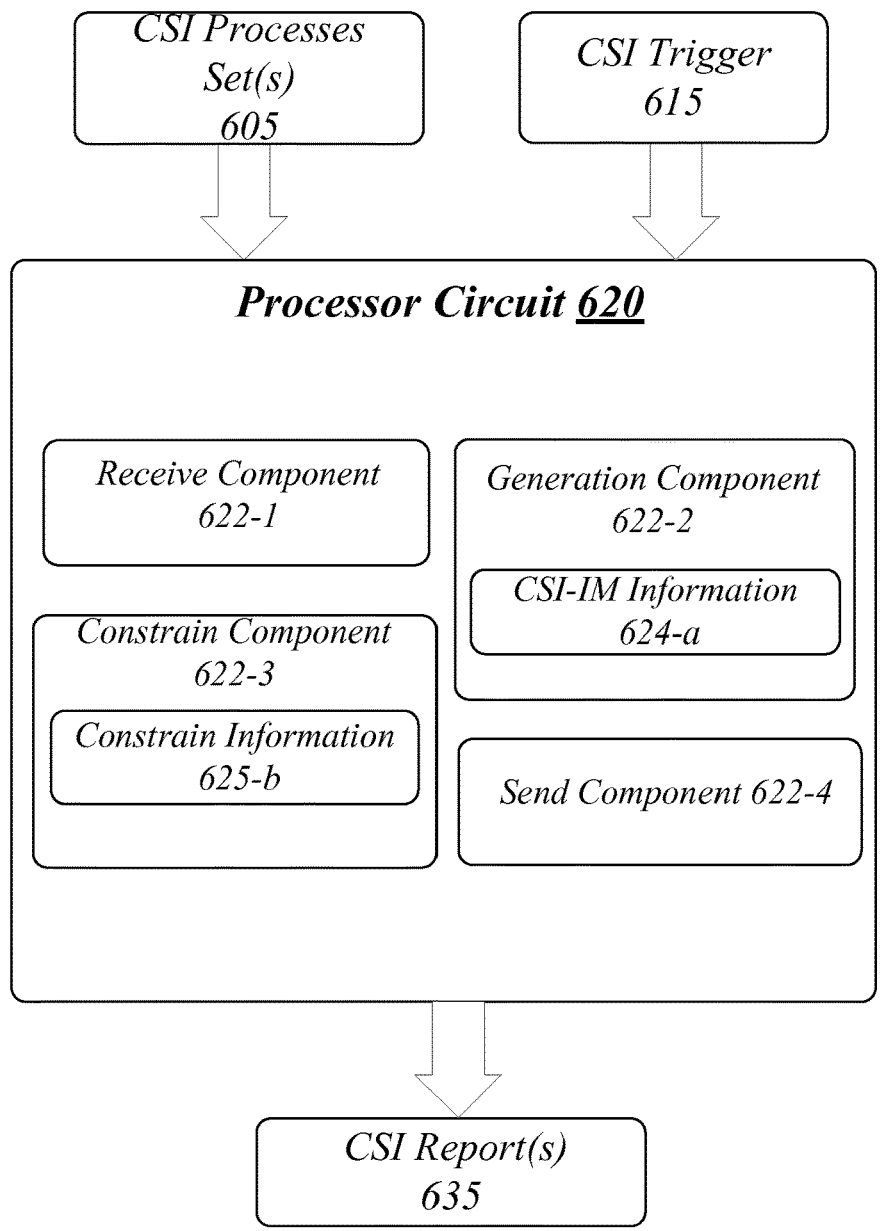
FIG. 6 illustrates an example block diagram for a first apparatus.

FIG. 6 illustrates a block diagram for an example first apparatus. As shown in FIG. 6, the example first apparatus includes apparatus 600. Although apparatus 600 shown in FIG. 6 has a limited number of elements in a certain topology, it may be appreciated that the apparatus 600 may include more or less elements in alternate topologies as desired for a given implementation.

The apparatus 600 may comprise a computer-implemented apparatus 600 having a processor circuit 620 arranged to execute one or more software components 622-a. It is worthy to note that "a" and "b" and "c" and similar designators as used herein are intended to be variables representing any positive integer. Thus, for example, if an implementation sets a value for a=4, then a complete set of software components 622-a may include components 622-1, 622-2, 622-3 and 622-4. The examples are not limited in this context.

According to some examples, apparatus 600 may be user equipment (e.g., located at or with UE 105), capable of operating in compliance with one or more 3GPP LTE Specifications. For example, apparatus 600 may be capable of communicatively coupling to an LTE and/or LTE-A compliant wireless network via one or more eNBs. The examples are not limited in this context.

In some examples, as shown in FIG. 6, apparatus 600 includes processor circuit 620. Processor circuit 620 may be generally arranged to execute one or more software components 622-a. The processing circuit 620 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 620.

According to some examples, apparatus 600 may include a receive component 622-1. Receive component 622-1 may be executed by processor circuit 620 to receive configured of CSI processes set 605 associated with a CoMP scheme for the UE including apparatus 600 to receive coordinated signals from up to three TPs. For these examples, a configured CSI processes set included in CSI processes set 605 may have been received in association of implementing the CoMP scheme to provide coordinated signals to the UE. The received CSI processes set may include a plurality of CSI processes each having a respective CSI-IM resource sent from eNBs participating in the CoMP scheme.

In some examples, apparatus 600 may also include a generation component 622-2. Generation component 622-2 may be executed by processor circuit 620 to generate one or more CSI reports using the CSI processes set. For these examples, CSI trigger 615 received from an eNB that configured the CSI processes set may cause generation component to generate the one or more CSI reports. Also, generation component 622-2 may have gathered CSI-IM information 624-a from the received CSI processes set (e.g., at least temporarily maintained in a data structure such as a lookup table (LUT)) and used this information to generate the one or more CSI reports.

In some examples, apparatus 600 may also include a constrain component 622-3. Constrain component 622-3 may be executed by processor circuit 620 to constrain CSI feedback for implementing the CoMP scheme. For these examples, constrain component 622-3 may use constrain information 625-b (e.g., maintained in a LUT) to determine what scheme or method is to be used to constrain CSI feedback. For example, constrain component 622-3 may limit a number of CSI reports to transmission cases associated with only two transmission points (e.g., see table 200). Constrain component 622-3 may alternatively cause generation component 622-2 to reuse a given RI for each generated CSI report. Constrain component 622-3 may also increase an amount of time for generation component to process the CSI processes set used to generate the one or more CSI reports. For increasing the amount of time, constrain component 622-3 may use a similar scheme as to those described above for either CSI report processing and reporting timeline 400 or multiple CSI report scaling scheme 500.

According to some examples, apparatus 600 may also include a report component 622-4. Report component 622-4 may be executed by processor circuit 620 to send the one or more generated CSI reports to facilitate implementing the CoMP scheme. For these examples, the one or more generated CSI reports may be sent as CSI Report(s) 635 to the eNB or base station that transmitted the CSI processes set used to generate the one or more CSI reports.

Various components of apparatus 600 and a device implementing apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example of a logic flow 700. Logic flow 700 may be representative of some or all of the operations executed by one or more logic, features, or devices described herein, such as apparatus 600. More particularly, logic flow 700 may be implemented by receive component 622-1, generation component 622-2, constrain component 622-3 or report component 622-4.

In the illustrated example shown in FIG. 7, logic flow 700 at block 702 may receive a CSI processes set associated with a CoMP scheme for the UE to receive coordinated signals from at least three TPs. In some examples, receive component 622-1 of apparatus 600 (e.g., included in UE 105) may receive configured measurement CSI processes set included in CSI processes set 605 in association with implementing the CoMP scheme with the UE.

According to some examples logic flow 700 may receive a CSI trigger at block 704. For these examples, receive component 622-1 may receive CSI trigger 615 from an eNB that configured and sent or transmitted CSI processes set 605 to the UE.

According to some examples, logic flow 700 at block 706 may generate one or more CSI reports (e.g., via generation component 622-2) using the CSI processes set based on constraining CSI feedback for implementing the CoMP scheme. Logic flow at block 708 may constrain by limiting a number of CSI reports based on only two TPs. Logic flow at block 710 may constrain by reusing a given RI for each generated CSI report. Logic flow at block 712 may constrain by increasing an amount of time for processing the CSI processes set to generate the one or more CSI reports. For the above constraints in blocks 708, 710 or 712, constrain component 622-3 may utilize constrain information 625-b to determine which constraint(s) to apply.

According to some examples, logic flow 700 at block 714 may send the one or more generated CSI reports to facilitate implementing the CoMP scheme. For these examples, report component 622-4 may send or transmit CSI report(s) 635 to the eNB that transmitted/configured CSI processes set 605.

FIG. 8 illustrates an embodiment of a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
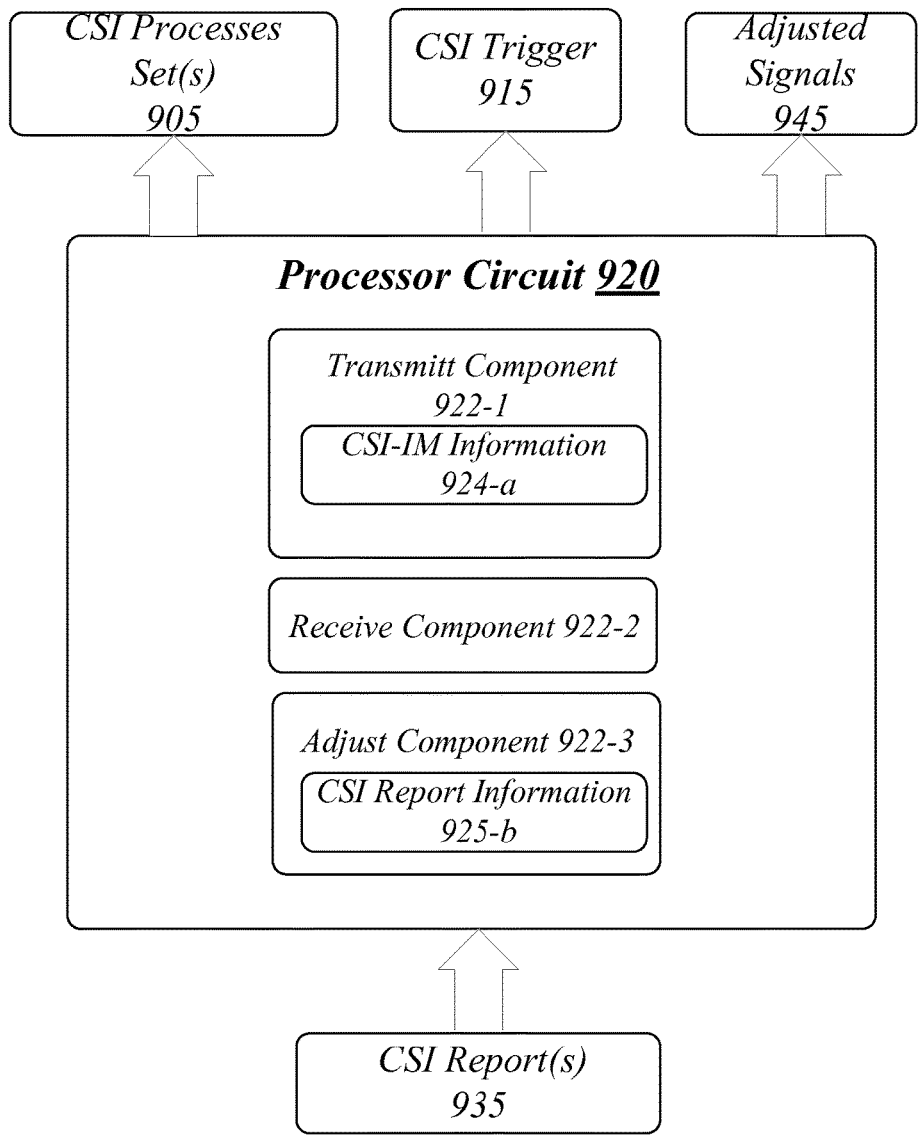
FIG. 9 illustrates an example block diagram for a second apparatus.

FIG. 9 illustrates a block diagram for an example second apparatus. As shown in FIG. 9, the example second apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may comprise a computer-implemented apparatus 900 having a processor circuit 920 arranged to execute one or more software components 922-a. It is worthy to note that "a" and "b" and "c" and similar designators as used herein are intended to be variables representing any positive integer. Thus, for example, if an implementation sets a value for a=3, then a complete set of software components 922-a may include components 922-1, 922-2 and 922-3. The examples are not limited in this context.

According to some examples, apparatus 900 may be system equipment (e.g., located at or with BS 111, 121 or 131), such as network equipment for a communications system or network compliant with one or more 3GPP LTE Specifications. For example, apparatus 900 may be implemented as part of a base station or eNB for an LTE and/or LTE-A compliant wireless network. Although some examples are described with reference to a base station or eNB, examples may utilize any network equipment for a communications system or network. The examples are not limited in this context.

In some examples, as shown in FIG. 9, apparatus 900 includes processor circuit 920. Processor circuit 920 may be generally arranged to execute one or more software components 922-a. The processing circuit 920 can be any of various commercially available processors to included, but not limited to the processors mentioned above for apparatus 900.

According to some examples, apparatus 900 may include a transmit component 922-1. Transmit component 922-1 may be executed by processor circuit 920 to transmit a CSI trigger to cause a UE to generate one or more CSI reports associated with CSI processes sets received by the UE from an eNB including apparatus 900. The CSI processes set and the CSI trigger may be associated with implementing a CoMP scheme with the UE that includes the UE receiving coordinated signals from more than two TPs with the eNB being one of the more than two TPs. For these examples, transmit component 922-1 may have transmitted the CSI processes set to the UE in CSI processes set 905 and also transmitted the CSI trigger to the UE via CSI trigger 915. In some examples, each CSI process included in CSI processes set 905 may include a CSI-IM resource generated based on CSI-IM information 924-a. CSI-IM information 924-a b may be maintained in a LUT by transmit component 922-1.

In some examples, apparatus 900 may also include a receive component 922-2. Receive component 922-2 may be executed by processor circuit 920 to receive one or more CSI reports from the UE based on the UE constraining CSI feedback. For these examples, the one or more CSI reports may be received by receive component 922-2 in CSI report(s) 935 from the UE.

In some examples, apparatus 900 may also include an adjust component 922-3. Adjust component 922-3 may be executed by processor circuit 920 to adjust coordinated signals transmitted to the UE based, at least in part, on the one or more CSI reports received by receive component 922-2. For these examples, adjust component 922-3 may cause the eNB including apparatus 900 to transmit adjusted signals 945 based, at least in part, on CSI report(s) 935 that may be at least temporarily maintained in CSI report information 925-b (e.g., in a LUT).

Various components of apparatus 900 and a device implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by transmit component 922-1, receive component 922-2 or adjust component 922-3.

In the illustrated example shown in FIG. 10, logic flow 1000 at block 1002 may transmit a CSI trigger to a UE to cause the UE to generate one or more CSI reports associated with a CSI processes set received by the UE from the eNB for implementing a CoMP scheme with the UE that includes the UE receiving coordinated signals from more than two TPs, the eNB being one of the more than two transmission points. In some examples, transmit component 922-1 of apparatus 900 (e.g., included in BS 111) may transmit CSI trigger 915 to trigger generation of the one or more CSI reports based on configured CSI processes set 905.

According to some examples, logic flow 1000 at block 1004 the one or more CSI reports may be received from the UE based on the UE constraining CSI feedback. Constraining CSI feedback may include the UE limiting a number of CSI reports based on only two TPs. Constraining the CSI feedback may also include the UE reusing a given RI for each generated CSI report. Constraining the CSI feedback may also include the UE increasing an amount of time for the UE to process the CSI processes set, generate the one or more CSI reports and transmit the one or more CSI reports. A number of CSI-IM resources associated with respective CSI processes included in the CSI processes set may also be limited. For these examples, receive component 922-2 may receive the one or more CSI reports via CSI report(s) 935.

According to some examples logic flow 1000 at block 1006 may adjust coordinated signals transmitted to the UE based, at least in part, on the one or more CSI reports. For these examples, adjust component 922-3 may use the one or more CSI reports included in CSI report(s) 935 to send or transmit adjusted signals 945 to the UE.

FIG. 11 illustrates an embodiment of a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
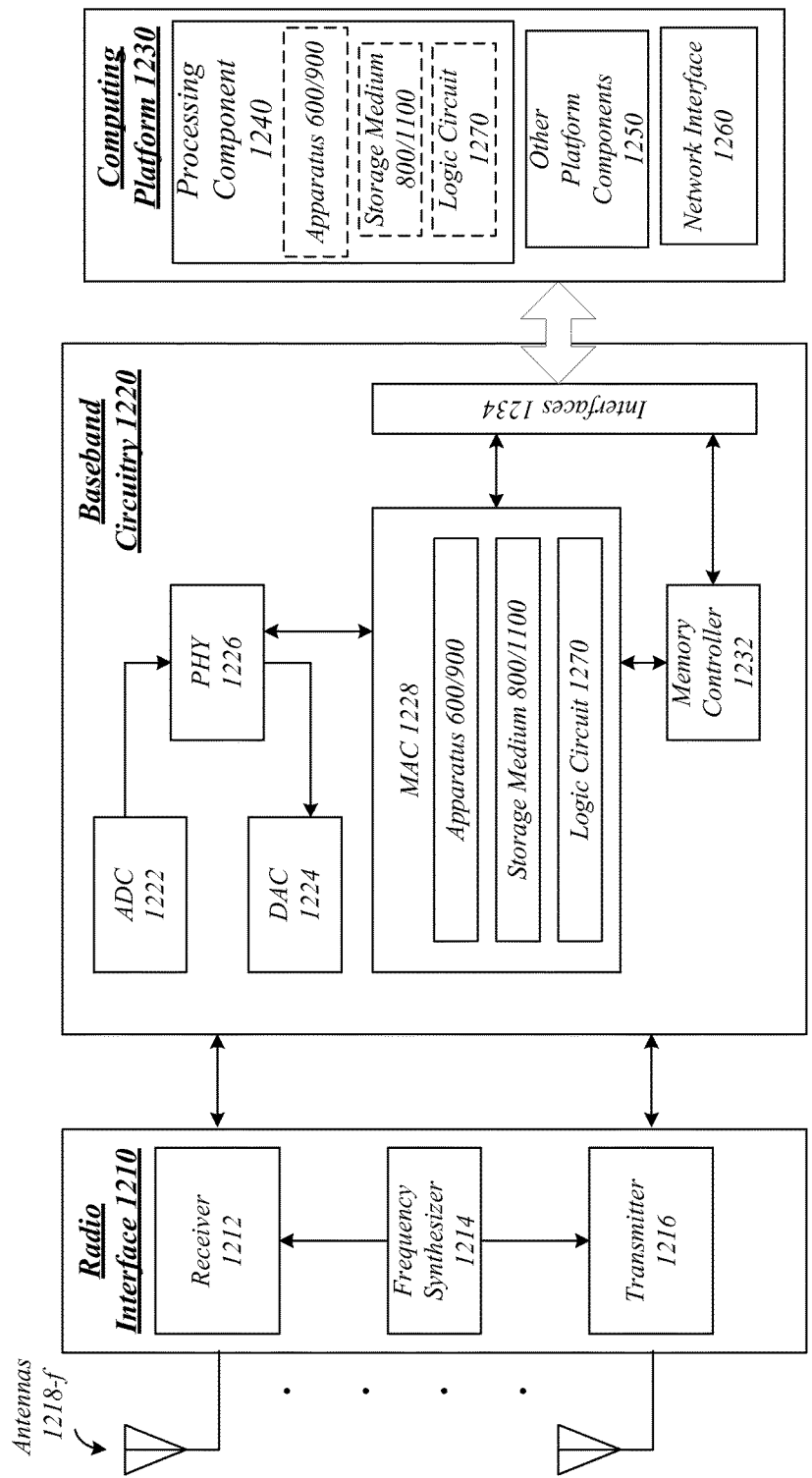
FIG. 12 illustrates an example of a device.

FIG. 12 illustrates an embodiment of a device 1200 for use in a broadband wireless access network. Device 1200 may implement, for example, apparatus 600, storage medium 1000 and/or a logic circuit 1270. The logic circuit 1270 may include physical circuits to perform operations described for apparatus 600 or apparatus 900. As shown in FIG. 12, device 1200 may include a radio interface 1210, baseband circuitry 1220, and computing platform 1230, although examples are not limited to this configuration.

The device 1200 may implement some or all of the structure and/or operations for the apparatus 600/900, storage medium 800/1100 and/or logic circuit 1270 in a single computing entity, such as entirely within a single device. Alternatively, the device 1200 may distribute portions of the structure and/or operations for apparatus 600/900, storage medium 800/1100 and/or logic circuit 1270 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218-*f*. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with MAC processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames (e.g., containing subframes). Alternatively or in addition, MAC processing circuit 1228 may share processing for certain of these functions or perform these processes independent of PHY processing circuit 1226. In some embodiments, MAC and PHY processing may be integrated into a single circuit.

Computing platform 1230 may provide computing functionality for device 1200. As shown, computing platform 1230 may include a processing component 1240. In addition to, or alternatively of, baseband circuitry 1220 of device 1200 may execute processing operations or logic for apparatus 600/900, storage medium 800/1100, and logic circuit 1270 using the processing component 1230. Processing component 1240 (and/or PHY 1226 and/or MAC 1228) may comprise various hardware elements, software elements, or a combination of both. Examples of hardware elements may include devices, logic devices, components, processors, microprocessors, circuits, processor circuits (e.g., processor circuit 620 or 920), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1230 may further include a network interface 1260. In some examples, network interface 1260 may include logic and/or features to support an X2 interface as described in one or more 3GPP LTE or LTE-A specifications or standards. For these examples, network interface 1260 may enable an apparatus 900 located at a base station to communicatively couple to one or more other base stations via an X2 communication channel. In some other examples, network interface 1260 may include logic and/or features to support other communication interface described in the one or more 3GPP LTE or LTE-A specifications. For these examples, network interface 1260 may enable an apparatus 600 located with a UE or an apparatus 900 located with a base station to communicatively couple to one or more other base stations via a wireless communications link.

Device 1200 may be, for example, user equipment, a computer, a personal computer (PC), a desktop computer, a laptop computer, an ultrabook computer, a smartphone, a tablet computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, wireless access point, base station, node B, evolved node B, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1200 may be implemented using single input single output (SISO) architectures. However, certain implementations may include multiple antennas (e.g., antennas 1218-*f*) for transmission and/or reception using adaptive antenna techniques for beamforming or spatial division multiple access (SDMA) and/or using multiple input multiple output (MIMO) communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 13:
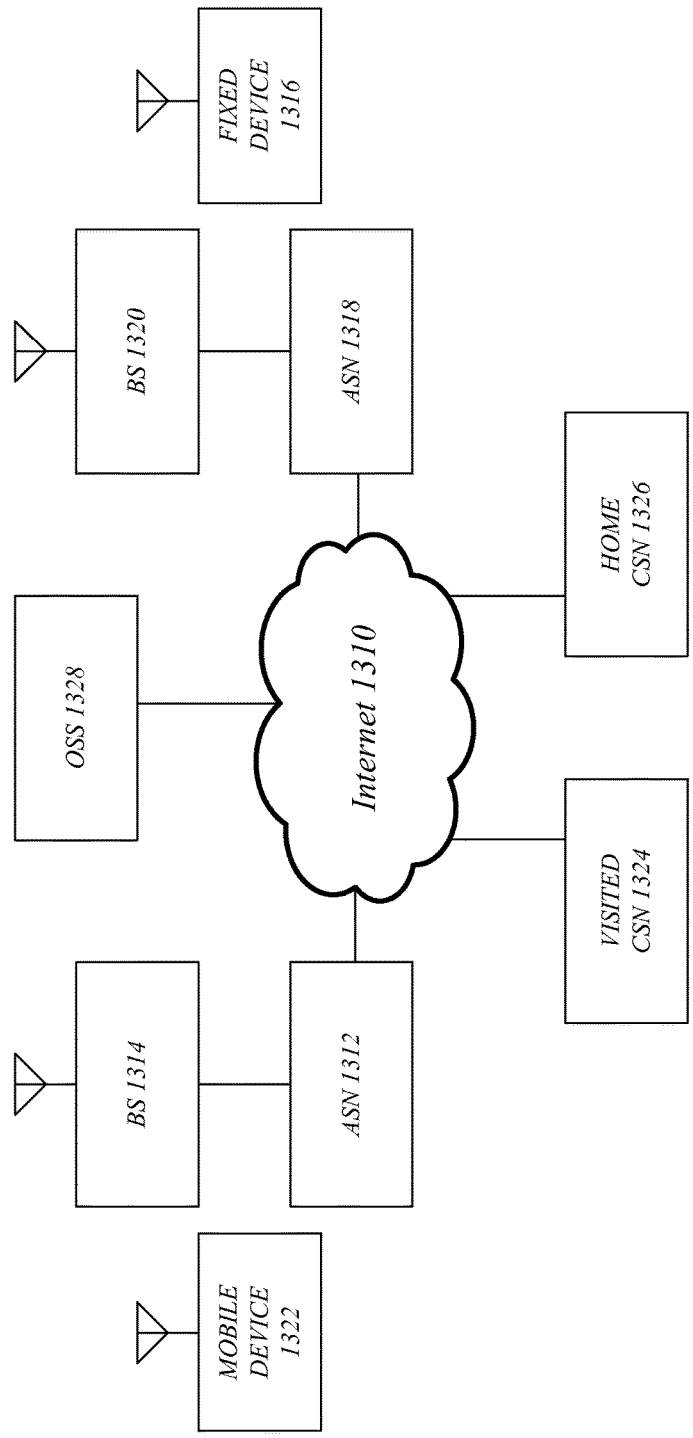
FIG. 13 illustrates an example of a broadband wireless access system.

FIG. 13 illustrates an embodiment of a broadband wireless access system 1300. As shown in FIG. 13, broadband wireless access system 1300 may be an internet protocol (IP) type network comprising an internet 1310 type network or the like that is capable of supporting mobile wireless access and/or fixed wireless access to internet 1310. In one or more embodiments, broadband wireless access system 1300 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1300, access service networks (ASN) 1314, 1318 are capable of coupling with base stations (BS) 1314, 1320 (RRHs or eNBs), respectively, to provide wireless communication between one or more fixed devices 1316 and internet 1310, or one or more mobile devices 1322 and Internet 1310. One example of a fixed device 1316 and a mobile device 1322 is UE 105, with the fixed device 1316 comprising a stationary version of UE 105 and the mobile device 1322 comprising a mobile version of UE 105. ASN 1312 may implement profiles that are capable of defining the mapping of network functions to one or more physical entities on broadband wireless access system 1300. Base stations 1314, 1320 (or eNBs) may comprise radio equipment to provide RF communication with fixed device 1316 and mobile device 1322, such as described with reference to device 1300, and may comprise, for example, the PHY, MAC, RLC or PDCP layer equipment in compliance with a 3GPP LTE Specification or an IEEE 802.16 Standard. Base stations 1314, 1320 (or eNBs) may further comprise an IP backplane to couple to Internet 1310 via ASN 1312, 1318, respectively, although the scope of the claimed subject matter is not limited in these respects.

Broadband wireless access system 1300 may further comprise a visited connectivity service network (CSN) 1324 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1324 or home CSN 1326, and the scope of the claimed subject matter is not limited in these respects. Visited CSN 1324 may be referred to as a visited CSN in the case where visited CSN 1324 is not part of the regular service provider of fixed device 1316 or mobile device 1322, for example where fixed 1316 or mobile device 1322 is roaming away from their respective home CSN 1326, or where broadband wireless access system 1300 is part of the regular service provider of fixed device 1316 or mobile device 1322 but where broadband wireless access system 1300 may be in another location or state that is not the main or home location of fixed device 1316 or mobile device 1322.

Fixed device 1316 may be located anywhere within range of one or both base stations 1314, 1320, such as in or near a home or business to provide home or business customer broadband access to Internet 1310 via base stations 1314, 1320 and ASN 1312, 1318, respectively, and home CSN 1326. It is worthy to note that although fixed device 1316 is generally disposed in a stationary location, it may be moved to different locations as needed. Mobile device 1322 may be utilized at one or more locations if mobile device 1322 is within range of one or both base stations 1314, 1320, for example.

In accordance with one or more embodiments, operation support system (OSS) 1328 may be part of broadband wireless access system 1300 to provide management functions for broadband wireless access system 1300 and to provide interfaces between functional entities of broadband wireless access system 1300. Broadband wireless access system 1300 of FIG. 13 is merely one type of wireless network showing a certain number of the components of broadband wireless access system 1300, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, example first computer-implemented methods may include receiving, at UE capable of operating in compliance with one or more 3GPP LTE standards that may include LTE-A, CSI processes set associated with a CoMP scheme for the UE to receive coordinated signals from more than two transmission points. The example first computer-implemented methods may also include generating one or more CSI reports using the CSI processes set based on constraining CSI feedback for implementing the CoMP scheme. Constraining CSI feedback may include at least one of limiting a number of CSI reports based on only two transmission points, reusing a given RI for each generated CSI report or increasing an amount of time for the UE to process the CSI processes set to generate the one or more CSI reports. The example first computer-implemented method may also include transmitting the one or more generated CSI reports to facilitate implementing the CoMP scheme.

In some examples, the example first computer-implemented methods may also include receiving a CSI trigger and generating and transmitting the one or more CSI reports responsive to receiving the CSI trigger.

According to some examples for the example first computer-implemented methods, the CSI trigger may be received from an eNB from among the more than two transmission points and transmitting the one or more CSI reports to the eNB.

In some examples for the example first computer-implemented methods, increasing the amount of time for the UE to process the CSI processes set to generate the one or more CSI reports may include determining a CSI value for a given CSI process based on the received CSI processes set at least N subframes prior to receiving the CSI trigger and both generating and sending the given CSI report in K subframes after receiving the CSI trigger, where N and K equate to any positive whole integer.

According to some examples for the example first computer-implemented methods, increasing the amount of time for the UE to process the CSI processes set to generate the one or more CSI reports may include generating two or more CSI reports and scaling a CSI report generation periodicity associated with each generated CSI report from among the two or more CSI reports such that the UE is capable of serially processing CSI processes sets respectively associated with each generated CSI report.

In some examples for the example first computer-implemented methods, the number of CSI reports based on only two transmission points may include selecting first and second transmission points based on respective strongest coordinated signals received from these first and second transmission points. A total of four CSI reports may be generated based on four transmission cases associated with transmissions received at the UE from the first and second transmission points.

According to some examples for the example first computer-implemented methods, the four transmission cases may include interference from the first transmission point while the second transmission point is a serving transmission point, interference from the second transmission point while the first transmission point is the serving transmission point, no interference from the first transmission point while the second transmission point is the serving transmission point or no interference from the second transmission point while the first transmission point is the serving transmission point.

In some examples for the example first computer-implemented methods, the CSI processes set may include a plurality of CSI processes. Each CSI processes may include a CSI-IM resource sent from eNBs from among the more than two transmission points.

According to some examples for the example first computer-implemented methods, constraining CSI feedback may include limiting a number of CSI-IM resources used to generate the one or more CSI reports based on only two transmission points.

In some examples for the example first computer-implemented methods, reusing the given RI for each generated CSI report may include determining, for one given CSI process from among the plurality of CSI processes, the given RI considering a configured 3GPP LTE codebookSubsetRestriction parameter. For these examples, the given RI may be used to determine CQIs and PMIs of other given CSI processes from among the plurality of CSI processes considering other configured 3GPP LTE codebookSubsetRestriction parameters for the other given CSI processes.

According to some examples for the example first computer-implemented methods, the CoMP scheme may include a joint transmission CoMP scheme, a DPS/DPB CoMP scheme or a CS/CB CoMP scheme.

According to some examples, at least one machine readable medium comprising a plurality of instructions that in response to being executed on a system for a wireless device cause the system to carry out the example first computer-implemented methods as mentioned above.

In some examples, a first apparatus may comprise means for performing the first computer-implemented methods as mentioned above.

According to some examples, an example second apparatus to facilitate implementing a CoMP scheme may include a processor circuit for a UE capable of operating in compliance with one or more 3GPP LTE standards that may include LTE-A. The example second apparatus may also include a receive component for execution by the processor circuit to receive a CoMP measurement associated with the CoMP scheme for the UE to receive coordinated signals from at least three transmission points. The example second apparatus may also include a generation component for execution by the processor circuit to generate one or more CSI reports using the CSI processes set. The example second apparatus may also include a constrain component for execution by the processor circuit to constrain CSI feedback for implementing the CoMP scheme by limiting a number of CSI reports to transmission cases associated with only two transmission points, by causing the generation component to reuse a given RI for each generated CSI report or by increasing an amount of time for the generation component to process the CSI processes set used to generate the one or more CSI reports. The example second apparatus may also include a report component for execution by the processor circuit to send the one or more generated CSI reports to facilitate implementing the CoMP scheme.

In some examples for the example second apparatus, the receive component may receive a CSI trigger and responsive to receiving the CSI trigger, the generate component may generate the one or more CSI reports. The constrain component may increase the amount of time for the generate component to generate the one or more CSI reports by allowing the generate component to determine a CSI value for a given CSI report using the received CSI processes set at least N subframes prior to receiving the CSI trigger and allowing the report component to send the given CSI report in K subframes after receiving the CSI trigger. For these examples, N and K equate to any positive whole integer.

According to some examples for the example second apparatus, the receive component may receive the CSI trigger from an eNB from among the at least three transmission points and the report component to transmit the one or more CSI reports to the eNB.

In some examples for the example second apparatus, the constrain component to constrain CSI feedback by limiting a number of CSI reports to transmission cases associated with only two transmission points may include the constrain component selecting first and second transmission points based on respective strongest coordinated signals received from these first and second transmission points and allowing a total of four CSI reports to be generated by the generate component based on four transmission cases associated with transmissions received at the UE from the first and second transmission points.

According to some examples for the example second apparatus, the four transmission cases may include interference from the first transmission point while the second transmission point is a serving transmission point, interference from the second transmission point while the first transmission point is the serving transmission point, no interference from the first transmission point while the second transmission point is the serving transmission point or no interference from the second transmission point while the first transmission point is the serving transmission point.

In some examples for the example second apparatus, the CSI processes set may include a plurality of CSI processes. Each CSI processes may include a CSI-IM resource sent from eNBs from among the at least three transmission points.

According to some examples for the example second apparatus, the constrain component to constrain CSI feedback by causing the generation component to reuse the give RI for each generated CSI report may include the generation component determining, for one given CSI process from among the plurality of CSI processes, the given RI considering a configured 3GPP LTE codebookSubsetRestriction parameter, and using the given RI to determine CQIs and PMIs of other given CSI processes from among the plurality of CSI processes considering other configured 3GPP LTE codebookSubsetRestriction parameters for the other given CSI processes.

In some examples for the example second apparatus may include a digital display coupled to the processor circuit to present a user interface view.

According to some examples, an example at least one machine readable medium may include a plurality of instructions. For these examples the plurality of instructions in response to being executed on a system for an eNB capable of operating in compliance with one or more 3GPP LTE standards that may include LTE-A may cause the system to transmit a CSI trigger to a UE to cause the UE to generate one or more CSI reports associated with a CSI processes set received by the UE from the eNB for implementing a CoMP scheme with the UE. The CoMP scheme may include the UE receiving coordinated signals from more than two transmission points. The eNB may be one of the more than two transmission points. The instructions may also cause the system to receive the one or more CSI reports from the UE based on the UE constraining CSI feedback to the eNB. Constraining CSI feedback may include the UE limiting a number of CSI reports based on only two transmission points, the UE reusing a given RI for each generated CSI report or the UE increasing an amount of time for the UE to process the CSI processes set, generate the one or more CSI reports and transmit the one or more CSI reports. The instructions may also cause the system to adjust coordinated signals transmitted to the UE based, at least in part, on the one or more CSI reports.

In some examples for the at least one machine readable medium, the UE limiting the number of CSI reports based on only two transmission points may include the UE selecting first and second transmission points based on respective strongest coordinated signals received from these first and second transmission points. For these examples, a total of four CSI reports may be received from the UE based on four transmission cases associated with transmissions received at the UE from the first and second transmission points.

According to some examples for the at least one machine readable medium, the four transmission cases may include interference from the first transmission point while the second transmission point is a serving transmission point, interference from the second transmission point while the first transmission point is the serving transmission point, no interference from the first transmission point while the second transmission point is the serving transmission point or no interference from the second transmission point while the first transmission point is the serving transmission point.

In some examples for the at least one machine readable medium, the CSI processes set may include a plurality of CSI processes. Each CSI processes may include a CSI-IM resource sent from evolved node Bs (eNBs) from among the more than two transmission points.

According to some examples for the at least one machine readable medium, the CoMP scheme may include a joint transmission CoMP, a DPS/DPB CoMP scheme or a CS/CB CoMP scheme.

In some examples, example second computer-implemented methods may include transmitting, at an eNB capable of operating in compliance with one or more 3GPP LTE standards to include LTE-A, a CSI trigger to a UE to cause the UE to generate one or more CSI reports associated with a CSI processes set received by the UE from the eNB for implementing a CoMP scheme with the UE that includes the UE receiving coordinated signals from more than two transmission points. The eNB may be one of the more than two transmission points. The example second computer-implemented methods may also include receiving the one or more CSI reports from the UE based on the UE constraining CSI feedback to the eNB. For these examples, constraining CSI feedback may include the UE limiting a number of CSI reports based on only two transmission points, the UE reusing a given rank indicator (RI) for each generated CSI report or the UE increasing an amount of time for the UE to process the CSI processes set, generate the one or more CSI reports and transmit the one or more CSI reports. The example second computer-implemented methods may also include adjusting coordinated signals transmitted to the UE based, at least in part, on the one or more CSI reports.

According to some examples for the example second computer-implemented methods, the UE limiting the number of CSI reports based on only two transmission points may include the UE selecting first and second transmission points based on respective strongest coordinated signals received from these first and second transmission points. A total of four CSI reports may be received from the UE based on four transmission cases associated with transmissions received at the UE from the first and second transmission points.

According to some examples for the example second computer-implemented methods, the four transmission cases may include interference from the first transmission point while the second transmission point is a serving transmission point, interference from the second transmission point while the first transmission point is the serving transmission point, no interference from the first transmission point while the second transmission point is the serving transmission point or no interference from the second transmission point while the first transmission point is the serving transmission point.

In some examples for the example second computer-implemented methods, the CSI processes set may include a plurality of CSI processes. Each CSI processes may include a CSI-IM resource sent from evolved node Bs (eNBs) from among the more than two transmission points.

In some examples, a third apparatus may comprise means for performing the second computer-implemented methods as mentioned above.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, at user equipment (UE) capable of operating in compliance with one or more 3$^{rd}$ Generation Partnership Project (3GPP) Long Term Evolution (LTE) standards, a channel state information (CSI) processes set comprising three or more CSI processes, the CSI processes set associated with a coordinated multi-point (CoMP) scheme for the UE to receive coordinated signals from three or more transmission points, each of the three or more CSI processes corresponding to a respective one of the three or more transmission points;
   generating two or more CSI reports using the CSI processes set based on constraining CSI feedback for implementing the CoMP scheme, constraining the CSI feedback to include:
      selecting, by processing circuitry of the UE, two of the three or more transmission points to which the three or more CSI processes correspond; and
      limiting a number of CSI reports based on only considering transmission cases for the two selected transmission points;
   transmitting the two or more generated CSI reports to facilitate implementing the CoMP scheme;
   constraining the CSI feedback to include increasing the amount of time for the UE to process the CSI processes set to generate the two or more CSI reports by:
      determining a CSI value for a given CSI process based on the received CSI processes set at least N subframes prior to receiving a CSI trigger associated with a given one of the two or more CSI reports;
      both generating and sending the given CSI report in K subframes after receiving the CSI trigger, where N and K equate to any positive whole integer; and
      scaling a CSI report generation periodicity associated with each generated CSI report from among the two or more CSI reports such that the UE is capable of serially processing CSI processes sets respectively associated with each generated CSI report.

2. The computer-implemented method of claim 1 comprising:
   receiving a CSI trigger; and
   generating and transmitting the two or more CSI reports responsive to receiving the CSI trigger.

3. The computer-implemented method of claim 2, comprising receiving the CSI trigger from an evolved node B (eNB) from among the three or more transmission points and transmitting the two or more CSI reports to the eNB.

4. The computer-implemented method of claim 1, limiting the number of CSI reports based on only considering transmission cases for two of the three or more transmission points comprising:
   selecting first and second transmission points based on respective strongest coordinated signals received from these first and second transmission points; and
   generating a total of four CSI reports based on four transmission cases associated with transmissions received at the UE from the first and second transmission points.

5. The computer-implemented method of claim 4, the four transmission cases comprising interference from the first transmission point while the second transmission point is a serving transmission point, interference from the second transmission point while the first transmission point is the serving transmission point, no interference from the first transmission point while the second transmission point is the serving transmission point or no interference from the second transmission point while the first transmission point is the serving transmission point.

6. The computer-implemented method of claim 1, each of the three or more CSI processes to include a respective CSI interference measurement (CSI-IM) resource sent from an evolved node B (eNB) from among the three or more transmission points.

7. The computer-implemented method of claim 6, constraining the CSI feedback to include limiting a number of CSI-IM resources used to generate the two or more CSI reports based on only considering transmission cases for the two of the three or more transmission points.

8. The computer-implemented method of claim 1, constraining the CSI feedback to include reusing a given rank indicator (RI) for each generated CSI report, by:
determining, for one given CSI process from among the three or more CSI processes, the given RI by considering a configured 3GPP LTE codebookSubsetRestriction parameter, and
using the given RI to determine channel quality indicators (CQIs) and precoding matrix indicators (PMIs) of other given CSI processes from among the three or more CSI processes by considering other configured 3 GPP LTE codebookSubsetRestriction parameters for the other given CSI processes.

9. The computer-implemented method of 1, the CoMP scheme to include a joint transmission CoMP scheme, a dynamic point system/dynamic point blanking (DPS/DPB) CoMP scheme or a coordinated scheduling/coordinate beamforming (CS/CB) CoMP scheme.

10. An apparatus comprising:
a processor circuit for user equipment (UE) capable of operating in compliance with one or more $3^{rd}$ Generation Partnership Project (3GPP) Long Term Evolution (LTE) standards;
a receive component for execution by the processor circuit to receive a coordinated multi-point (CoMP) measurement associated with a CoMP scheme for the UE to receive coordinated signals from three or more transmission points;
a generation component for execution by the processor circuit to generate two or more channel state information (CSI) reports using a CSI processes set associated with the CoMP scheme, the CSI processes set to comprise three or more CSI processes, each of the three or more CSI processes to correspond to a respective one of the three or more transmission points;
a constrain component for execution by the processor circuit to constrain CSI feedback for implementing the CoMP scheme, constraining the CSI feedback to include:
selecting two of the three or more transmission points to which the three or more CSI processes correspond; and
limiting a number of CSI reports based on only considering transmission cases for the two selected transmission points;
a report component for execution by the processor circuit to send the two or more generated CSI reports to facilitate implementing the CoMP scheme;
the receive component to receive a CSI trigger, the generation component to generate the two or more CSI reports in response to receipt of the CSI trigger, the constrain component to constrain the CSI feedback by increasing an amount of time for the generation component to generate the two or more CSI reports by:
allowing the generation component to determine a CSI value for a given CSI report using the CSI processes set at least N subframes prior to receiving the CSI trigger;
allowing the report component to send the given CSI report in K subframes after receiving the CSI trigger, where N and K equate to any positive whole integer; and
scaling a CSI report generation periodicity associated with each generated CSI report from among the two or more CSI reports such that the UE is capable of serially processing CSI processes sets respectively associated with each generated CSI report.

11. The apparatus of claim 10, the receive component to receive the CSI trigger from an evolved node B (eNB) from among the three or more transmission points and the report component to transmit the two or more CSI reports to the eNB.

12. The apparatus of claim 10, the constrain component to select first and second transmission points from among the three or more transmission points based on respective strongest coordinated signals received from these first and second transmission points and allow a total of four CSI reports to be generated by the generate component based on four transmission cases associated with transmissions received at the UE from the first and second transmission points.

13. The apparatus of claim 12, the four transmission cases comprising interference from the first transmission point while the second transmission point is a serving transmission point, interference from the second transmission point while the first transmission point is the serving transmission point, no interference from the first transmission point while the second transmission point is the serving transmission point or no interference from the second transmission point while the first transmission point is the serving transmission point.

14. The apparatus of claim 10, each of the three or more CSI processes to include a CSI interference measurement (CSI-IM) resource sent from an evolved node B (eNB) from among the three or more transmission points.

15. The apparatus of claim 14, the constrain component to constrain the CSI feedback by causing the generation component to reuse a given rank indicator (RI) for each generated CSI report, the generation component to determine, for one given CSI process from among the three or more CSI processes, the given RI considering a configured 3GPP LTE codebookSubsetRestriction parameter, and use the given RI to determine channel quality indicators (CQIs) and precoding matrix indicators (PMIs) of other given CSI processes from among the three or more CSI processes considering other configured 3GPP LTE codebookSubsetRestriction parameters for the other given CSI processes.

16. The apparatus of claim 10, comprising a digital display coupled to the processor circuit to present a user interface view.

17. At least one non-transitory computer-readable storage medium comprising a set of instructions that, in response to being executed at user equipment (UE) capable of operating in compliance with one or more $3^{rd}$ Generation Partnership Project (3GPP) Long Term Evolution (LTE) standards, cause the UE to:
receive a coordinated multi-point (CoMP) measurement associated with a CoMP scheme for the UE to receive coordinated signals from three or more transmission points;
generate two or more channel state information (CSI) reports using a CSI processes set associated with the CoMP scheme, the CSI processes set to comprise three or more CSI processes, each of the three or more CSI processes to correspond to a respective one of the three or more transmission points;
constrain CSI feedback for implementing the CoMP scheme, constraining the CSI feedback to include:

selecting two of the three or more transmission points to which the three or more CSI processes correspond; and limiting a number of CSI reports based on only considering transmission cases for the two selected transmission points;

send the two or more generated CSI reports to facilitate implementing the CoMP scheme;

the instructions, in response to being executed at the UE, to cause the UE to:

receive a CSI trigger from an evolved node B (eNB) comprised among the three or more transmission points;

generate the two or more CSI reports in response to receipt of the CSI trigger;

constrain the CSI feedback by increasing an amount of time for generation of the two or more CSI reports by:

allowing determination of a CSI value for a given CSI report using the CSI processes set at least N subframes prior to receiving the CSI trigger;

allowing the given CSI report to be sent within K subframes after receiving the CSI trigger, where N and K equate to any positive whole integer; and scaling a CSI report generation periodicity associated with each generated CSI report from among the two or more CSI reports such that the UE is capable of serially processing CSI processes sets respectively associated with each generated CSI report; and transmit the two or more CSI reports to the eNB.

18. The at least one non-transitory computer-readable storage medium of claim 17, comprising instructions that, in response to being executed at the UE, cause the UE to:

select first and second transmission points from among the three or more transmission points based on respective strongest coordinated signals received from these first and second transmission points; and allow a total of four CSI reports to be generated based on four transmission cases associated with transmissions received at the UE from the first and second transmission points, the four transmission cases comprising interference from the first transmission point while the second transmission point is a serving transmission point, interference from the second transmission point while the first transmission point is the serving transmission point, no interference from the first transmission point while the second transmission point is the serving transmission point or no interference from the second transmission point while the first transmission point is the serving transmission point.

19. The at least one non-transitory computer-readable storage medium of claim 17, each of the three or more CSI processes to include a CSI interference measurement (CSI-IM) resource sent from an evolved node B (eNB) from among the three or more transmission points.

20. The at least one non-transitory computer-readable storage medium of claim 19, comprising instructions that, in response to being executed at the UE, cause the UE to constrain the CSI feedback by:

determining, for one given CSI process from among the three or more CSI processes, a given rank indicator (RI) considering a configured 3GPP LTE codebookSubsetRestriction parameter; and using the given RI to determine channel quality indicators (CQIs) and precoding matrix indicators (PMIs) of other given CSI processes from among the three or more CSI processes considering other configured 3GPP LTE codebookSubsetRestriction parameters for the other given CSI processes.

* * * * *